United States Patent [19]

Newnes et al.

[11] Patent Number: 5,826,637
[45] Date of Patent: Oct. 27, 1998

[54] METHOD AND APPARATUS FOR MULTIPLE FEEDING OF FLITCHES TO A BOARD EDGER

[75] Inventors: William R. Newnes; Steven W. Michell, both of Salmon Arm, Canada

[73] Assignee: Newnes Machine Ltd., Salmon Arm, Canada

[21] Appl. No.: 736,657

[22] Filed: Oct. 25, 1996

[51] Int. Cl.[6] .................................................... B27B 1/00
[52] U.S. Cl. ....................... 144/382; 83/367; 144/242.1; 144/245.2; 144/357; 144/378; 198/418.1; 198/434; 198/456; 364/474.09
[58] Field of Search ............................ 198/370.01, 418.1, 198/419.1, 427, 430, 431, 434, 445, 456, 462.3; 83/364, 367; 144/2.1, 3.1, 242.1, 245.2, 250.23, 250.25, 356, 357, 378, 382; 364/474.02, 474.09

[56] References Cited

U.S. PATENT DOCUMENTS

| | | | |
|---|---|---|---|
| 3,701,408 | 10/1972 | Northsea | 198/418.1 |
| 3,970,128 | 7/1976 | Kohlberg | 144/245.2 |
| 4,413,662 | 11/1983 | Greguire et al. | 144/245.2 |
| 5,201,354 | 4/1993 | Weissbeck | 83/367 |
| 5,368,080 | 11/1994 | Hamel | 144/245.2 |
| 5,381,712 | 1/1995 | Head, Jr. et al. | 83/367 |
| 5,417,265 | 5/1995 | Davenport et al. | 144/356 |

*Primary Examiner*—W. Donald Bray
*Attorney, Agent, or Firm*—Antony C. Edwards

[57] ABSTRACT

An apparatus for sequenced or simultaneous feeding of a plurality of flitches to a board edger includes a sequencing conveyor for sequenced feeding of flitches in a horizontal first direction, the flitches oriented in a horizontal second direction perpendicular to the first horizontal direction, the flitches fed sequentially into first or second adjacent parallel holding locations, a selectively actuable transfer device for selective transfer of a first fitch in the first direction from either of the first or second adjacent parallel holding locations onto a first edger feeder, and a second edger feeder parallel and adjacent to the first edger feeder, the first and second parallel adjacent edger feeders for selective sequential or simultaneous feeding into an edger according to a feed controller for (i) controlling the sequential or simultaneous feeding of the first flitch on the first edger feeder, and (ii) controlling the sequential or simultaneous feeding of a second flitch transferred from the first or second adjacent parallel holding locations onto the second edger feeder, wherein the first and second edger feeders may be fed flitches from the first or second holding locations according to optimizing feed selections made by the feed controller so that the first and second edger feeders may be actuated either sequentially or simultaneously to optimize input of the plurality of flitches into the edger according to optimizing sequencing decisions from the feed controller.

14 Claims, 10 Drawing Sheets

METHOD AND APPARATUS FOR MULTIPLE FEEDING OF FLITCHES TO A BOARD EDGER

FIELD OF THE INVENTION

This invention relates to a method and apparatus for producing boards from a flitch or a cant, and in particular relates to an interrelated edger and gang feed system and method for preparing and feeding, two narrow flitches or cants at the same time, or one wide flitch or cant by itself, according to inputs from an operator or an optimzer, for optimum sawing in a singular, multi-saw edger.

BACKGROUND OF THE INVENTION

Previously, an edger and infeed system could handle only one flitch at a time no matter what width the flitch was. This would under utilize the edgers capacity when narrow flitches are edged, within an edger much wider than the narrow flitch being edged at any given time. All saws are rotating in the edger, which is built to accept the widest flitch the mill is designed to cut, no matter whether there are small or large flitches passing through the edger, causing a waste of energy and capacity. Previous systems would have to wait until the last flitch had cleared the infeed area before feeding another flitch into the edger, even though there was room in the edger for another narrow flitch, restricting the capacity of a single machine center mill installation whenever small flitches were being edged. In some mills there have been systems built with two completely independent "stand alone" edgers and infeed tables, placed side by side, to keep up with the capabilities of the saw mill that is feeding the edging system. This type of edging system would cost in all probability twice as much as a single system, and also, many saw mills do not have the extra area needed for the additional infeed table, edger, tailer and waste conveyor. Also, this combined system would normally have two widths of edgers which would direct the wide width of flitches to the wide edger and the narrow flitches would be directed to the narrow edger. In this situation if one of the edgers failed then both systems would be inoperable.

It is therefore an object of the invention to produce an apparatus that will utilize a single multi-saw edger to its greater potential, while still achieving maximum recovery. It is also an object of the invention to maximize the use of the mill area available, eliminating the need to add a second parallel edger and feed systems to gain a similar capacity.

SUMMARY OF THE INVENTION

The present invention is a method and an apparatus that uses a board edger or gangsaw to its maximum potential by using a sequencing transfer table, with an optional sort deck, and a dual feeding positioning table that allows the feeding of two smaller width flitches through the edger at one time, and alternatively still allowing one (wider) fitch to be fed by itself. The device includes a scanner transfer with a plurality of rows of hook stops (hereinafter referred to as duckers), a scanner, an optimizer and a sequencing transfer table, also with a plurality of rows of duckers, that are rotated up into the path of the flitch (holding it for timed release) and then rotated down out of the path of the flitch, where the flitch once released advances up to a row of park zone pin stops that hold the flitch in position for a pair of positioners. The positioners are mounted on a positioning table. There is a plurality of pairs of positioners. Which positioner grasps the ends of the flitch will depend on the flitches' length. The positioners extend out to grasp the flitch. It should be noted that the apparatus could conceivably use a different type of positioner, which is known, that of a device that lifts the flitch from the pin stops and carries the flitch so as to position the flitch over the feedchains.

The sequencing transfer may also include an optional sort deck above the sequencing transfer (and potentially a manual input sort deck before the scanner), that stores either certain lengths, widths or species etc., depending on the logic being used. The positioners move substantially perpendicular to the flitch and extend out and grasp on to the flitch at both ends, where the fitch is located (in a location known by the optimizer) by two selected pin stops. The pin stops then retract down and the positioners retract back to position the flitch (and skew the flitch as necessary, as is determined by the optimizer) over a pair of grouped sharpchains (or feedchains) and a pair of drop pans (hereinafter referred to as drop skid assemblies), for infeed into the edger. The pair of grouped feedchains are mounted parallel to each other and parallel to the direction of feed into the edger saw blades. In an alternative embodiment, an extra plurality of pairs of positioners is provided. The apparatus allows either two positioners (one pair) extending to grasp one wide flitch, or four positioners (two pair) in motion at once to grasp two flitches at the same time, wherein one pair of positioners reaches further than the other pair of positioners. The two flitches are grasped at the same time, and then the two flitches are positioned at the same time on to the inner and the outer feedchains. This embodiment requires a second row of pin stops prior to the infeed table to position both flitches for grasping. Only one of the tandem pairs of positioners are in operation when grasping the ends of a wide, or single flitch. A plurality of infeed press rolls that press down on the flitch, pressing the flitch against the drop skid assemblies. The press rolls can operate independently, or in pairs when the grasping mechanisms on the positioners are released. The two drop skid assemblies lower independently (the press rolls still maintaining pressure), lowering the two narrow flitches, or one wide flitch, on to the feedchains, allowing the flitches to be fed either into the edger side by side or separately if a single wider flitch, or to feed a single short flitch onto the outer feedchains if the system is still feeding a longer flitch on the inner feedchains.

In a further alternative embodiment the pair or pairs of positioners are replaced by an overhead clamping positioner device that clamps onto the side edges of the flitch, near the ends of the flitch. The device includes an extended lifting mechanism. Normal positioners are also able to lift, but only enough to move the flitch over the drop skid assemblies and then to lower onto the feedchains while maintaining their grasp on the flitch. The extended lifting mechanism allows a flitch to be picked up from either park zone, lifted over a flitch in the second park zone, thereby allowing a simple sort, and positioned on the inner feedchains, or potentially in over to either feedchains as the optimum case may dictate, even as a long flitch is being fed into the edger.

The invention provides other advantages which will be made clear in the description of the preferred embodiments. In summary, however, the device of the present invention may be generally described as an apparatus for sequenced or simultaneous feeding of a plurality of flitches to a board edger, the apparatus including means for sequenced feeding of flitches in a horizontal first direction, the flitches oriented in a horizontal second direction perpendicular to the first direction, the flitches fed sequentially into first or second adjacent parallel holding locations, means for selective transfer of a first flitch in the first direction from either of the first or second adjacent parallel holding locations onto a first edger feeder, and a second edger feeder parallel and adjacent to the first edger feeder, the first and second parallel adjacent edger feeders for selective sequential or simultaneous feeding into an edger according to a feed control means for (i) controlling the sequential or simultaneous feeding of the first flitch on the first edger feeder, and (ii) controlling the sequential or simultaneous feeding of a second flitch transferred from the first or second adjacent parallel holding locations onto the second edger feeder, wherein the first and second edger feeders may be fed flitches from the first or second holding locations according to optimizing feed selections made by the feed control means so that the first and second edger feeders may be actuated either sequentially or simultaneously to optimize input of the plurality of flitches into the edger according to optimizing sequencing decisions from the feed control means.

Advantageously, the feed control means includes cooperating upstream scanner means, optimizer means, and programmable logic controller means. The means for sequenced feeding of flitches in a horizontal first direction may include a transfer chain and selectively actuable sequencing arrays of selectively positionable members spaced apart in the first direction, wherein the sequencing arrays are selectively actuable according to instructions from the feed control means. The means for sequenced feeding of flitches in a first horizontal direction may further include selectively actuable flitch drop-out means. The means for sequenced feeding of flitches in a first direction may also further include selectively elevatable flitch culling means for culling and elevating selected flitches, including a selectively elevatable sort deck having a sort deck ramp at upstream and downstream ends thereof, cooperating with a transfer chain translating flitches in the first direction, for transfer of flitches in the first direction from the transfer chain onto, across and down from the sort deck when the sort deck is in an elevated sorting position so as to thereby provide for sorting and culling flitches on said sort deck and for return of sorted flitches onto the transfer chain.

In one aspect the means for selective transfer of the first flitch in a the first direction is at least one selectively actuable, and selectively translatable in the first direction, means for grasping and selectively raising and lowering a flitch so as to: (a) selectively grasp and raise a flitch, (b) selectively translate the flitch in the first direction, (c) selectively skew the flitch in a horizontal plane if so instructed by the feed control means, and (d) selectively lower and release said flitch onto the first or second parallel adjacent edger feeders.

Further advantageously, the means for grasping and selectively raising and lowering a flitch includes selectively actuable opposed clamping jaws for selective clamping of a flitch between the clamping jaws, and wherein the opposed clamping jaws are rigidly supported on at least one flitch positioner frame, the at least one flitch positioner frame selectively elevatable by first selective actuating means and selectively translatable in the first direction by second selective actuating means.

In a second aspect, the at least one flitch positioner frame is elongate in the first direction and the means for grasping and selectively raising and lowering a flitch further includes a pair of adjacent parallel flitch positioner frames longitudinally parallel in the first direction, the flitch positioner frames each defining therein an elongate cavity extending in the first direction from an upstream end, the opposed clamping jaws mounted in opposed relation at the upstream end, the elongate cavity sized to receive therein the first and second edger feeders. The flitch positioner frames and corresponding said elongate cavities may each lie in a generally vertical plane in the first direction. The elongate cavities define a vertical first opening at the upstream end, and the opposed clamping jaws straddle the first opening. In a third aspect, on at least one of said flitch positioning frames the opposed clamping jaws are vertically opposed across the first opening.

In an alternative aspect, on at least one of the flitch positioning frames the opposed clamping jaws are horizontally opposed in the first direction across the first opening.

The first and second parallel adjacent edger feeders may include selectively elevatable press rolls for selectively applying a downward force to frictionally engage flitches on the first and second edger feeders in registration with corresponding selectively elevatable drop skid assemblies, selectively elevatable so as to selectively feed flitches from the drop skid assemblies onto transfer means conveying flitches on the first and second edger feeders in the generally horizontal second direction, generally perpendicular to the first direction, into an edger, wherein the edger may include selectively positionable saws selectively positionable across the transfer means, the selectively positionable saws selectively positioned according to instructions from the programmable logic controller.

In a further aspect, the flitch positioner frames may be "U"-shaped members.

BRIEF DESCRIPTION OF THE DRAWINGS

The invention will be better understood by reference to drawings, wherein.

DETAILED DESCRIPTION OF THE PREFERRED EMBODIMENT

Figure 1:
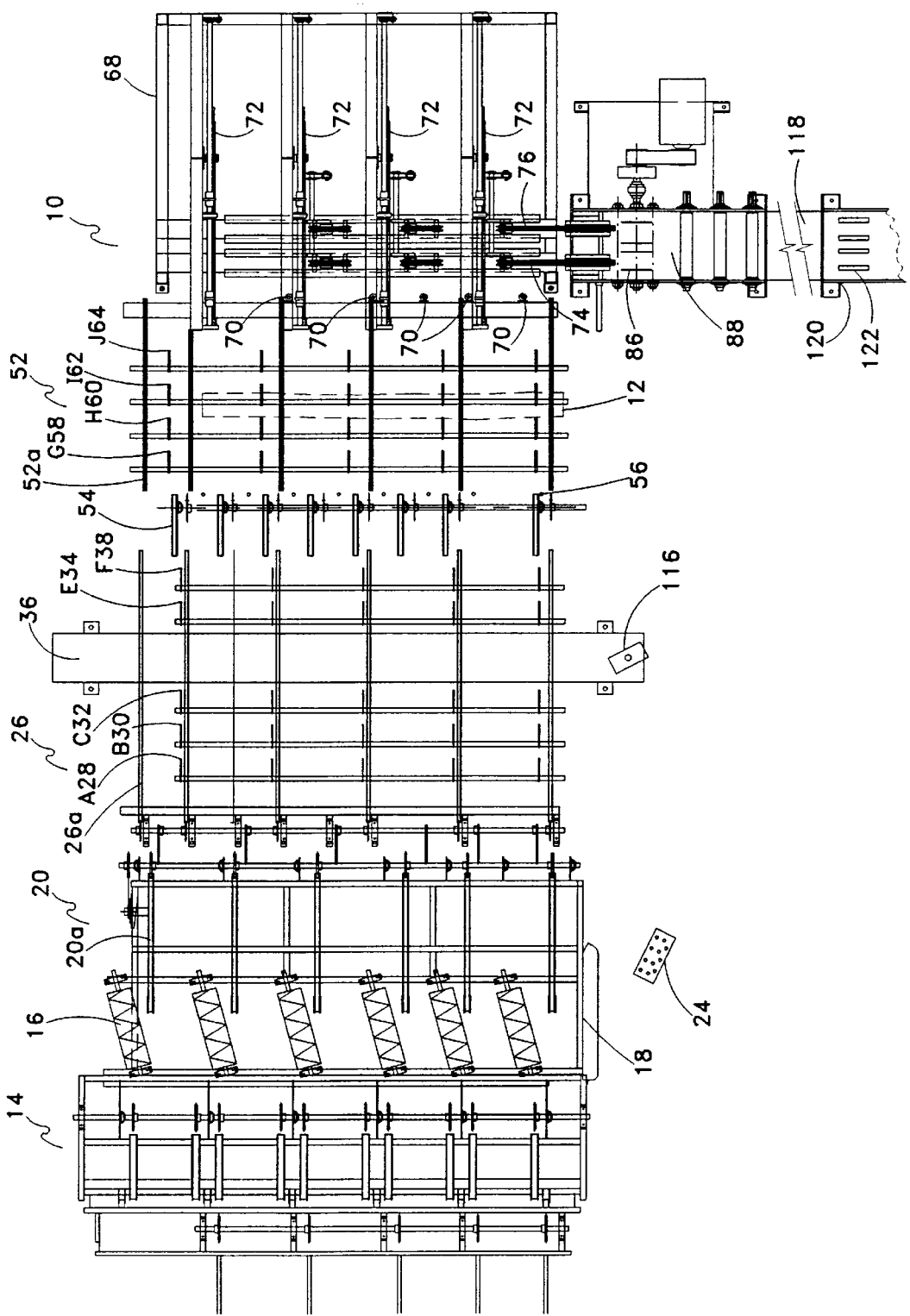
FIG. 1 is a plan view according to a preferred embodiment of the invention.

Referring to the drawing figures wherein similar characters of reference represent corresponding parts in each view, the edger infeed table apparatus is generally indicated by the reference numeral 10.

Figure 2:
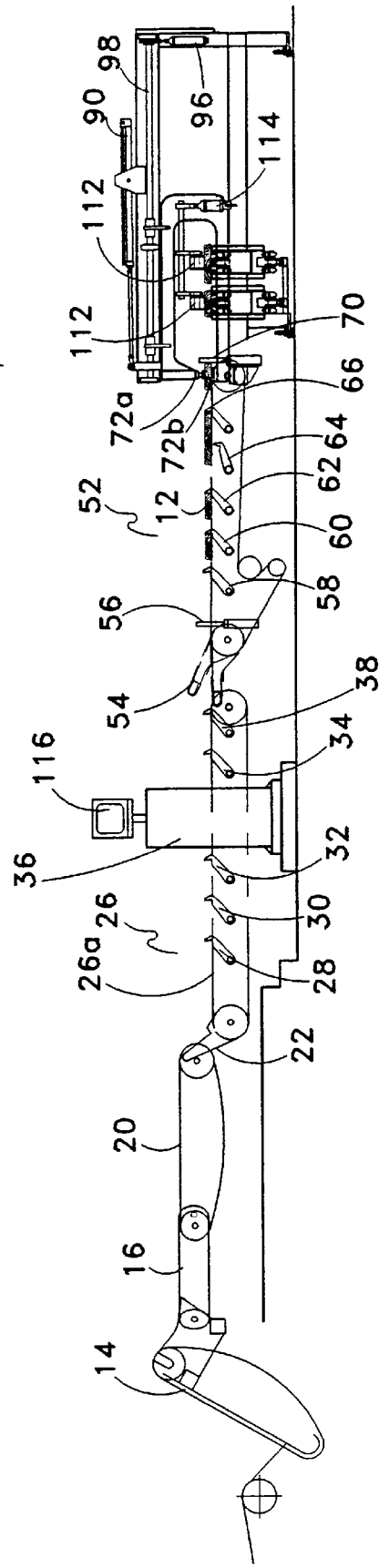
FIG. 2 is a side elevation view according to a preferred embodiment of the invention.

As seen in FIGS. 1 and 2, flitch 12 is fed onto an unscrambler 14. Unscrambler 14 feeds a plurality of ending rolls 16 that end the flitch 12 up against a fence 18. The flitch 12 feeds onto a transfer table 20 having transfer chains 20a. Pass-turn gate 22 is controlled by an operator who inputs a decision on the operation console 24 to cull a flitch 12 if broken or substantially mis-shaped, or to cull out selected size, species or grades, or if rot is visible to the operator. Otherwise, flitch 12 is sent on through to a scanner transfer 26. The operator may also choose to send the flitch up onto an optional pre-scanner sort deck (not shown).

Scanner transfer 26 includes a scanner transfer chains 26a, and a ducker 28 which receives the flitch 12. Ducker 28 is normally down. When a ducker 30 on the scanner transfer 26 becomes available, the flitch 12 is advanced from ducker 28 to ducker 30. Ducker 30 is normally down. When a ducker 32 becomes available, the flitch 12 will advance from ducker 30 to ducker 32. Ducker 32 is normally down. When ducker 34 on the scanner transfer 26 becomes available, flitch 12 is advanced from ducker 32 to a ducker 34. Ducker 34 is normally down. Scanner 36 is located between ducker 32 and ducker 34. When ducker 34 becomes available flitch 12 passes through scanner 36 to ducker 34. Scanner transfer 26 includes ducker 38. When ducker 38 becomes available flitch 12 passes from ducker 34 to ducker 38. Ducker 38 is normally down.

Figure 5:
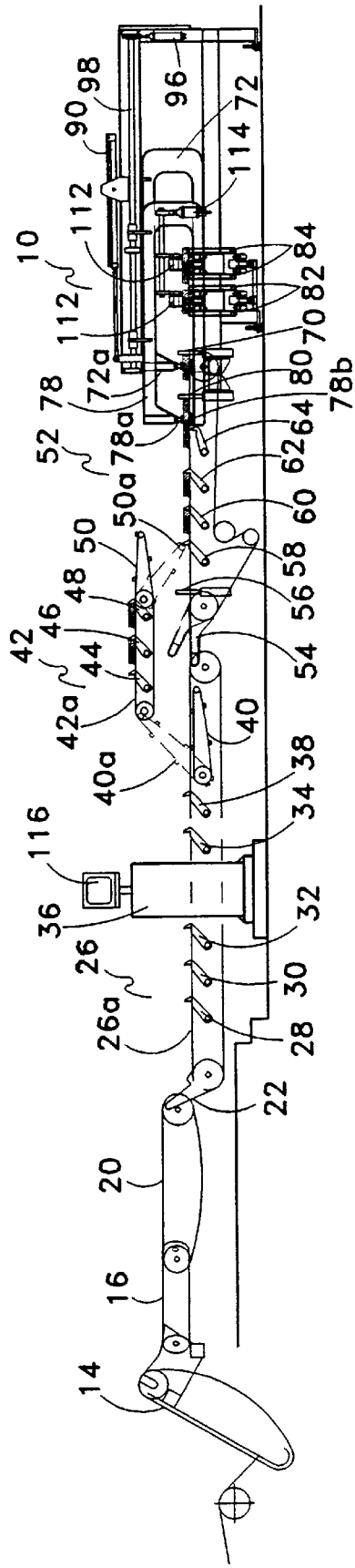
FIG. 5 is a side elevation view according to an alternative embodiment of the invention.

As the flitch passes ducker 38 there may be, as seen in FIG. 5, an optional sort deck ramp 40 may be provided downstream of ducker 38. Sort deck ramp 40 rotates up from below the scanner transfer 26, lifting and sorting any flitches up to a flitch sort deck 42. Sort deck up-ramp 40 includes a plurality of lugged transfer chains 40a that assist the raising of any sorted flitches. Sort deck 42 includes a plurality of chains 42a and duckers 44, 46 and 48. Duckers 44 and 46 are normally down. Ducker 48 is normally up. A sort deck down-ramp 50 is provided, which rotates down from the sort deck 42. The down-ramp 50 includes a plurality of lugged transfer chains 50a that assist in the lowering of any sorted flitches on to a sequencing transfer 52.

Sequencing transfer 52 includes sequencing transfer chains 52a, and a drop-out gate 54 for removal of flitches that have been scanned and are not to be edged. Sequencing transfer 52 includes a row of pin stops 56. When pin stops 56 become available flitch 12 will advance from ducker 38 to pin stops 56. Pin stops 56 are normally up. Sequencing transfer 52 includes a ducker 58. Flitch 12 sequences from pin stops 56 to ducker 58 when ducker 58 becomes available. Ducker 58 is normally down. Flitch 12 sequences from 58 to ducker 60 when ducker 60 becomes available. Ducker 60 is normally down. Flitch 12 sequences from ducker 60 to ducker 62 when ducker 62 becomes available. Ducker 62 is normally down. Flitch 12 sequences from ducker 62 to ducker 64 when ducker 64 becomes available. Ducker 64 is normally down. Flitch 12 sequences from ducker 64 to ducker 66 when ducker 66 becomes available. Ducker 66 is normally down.

Figure 3:
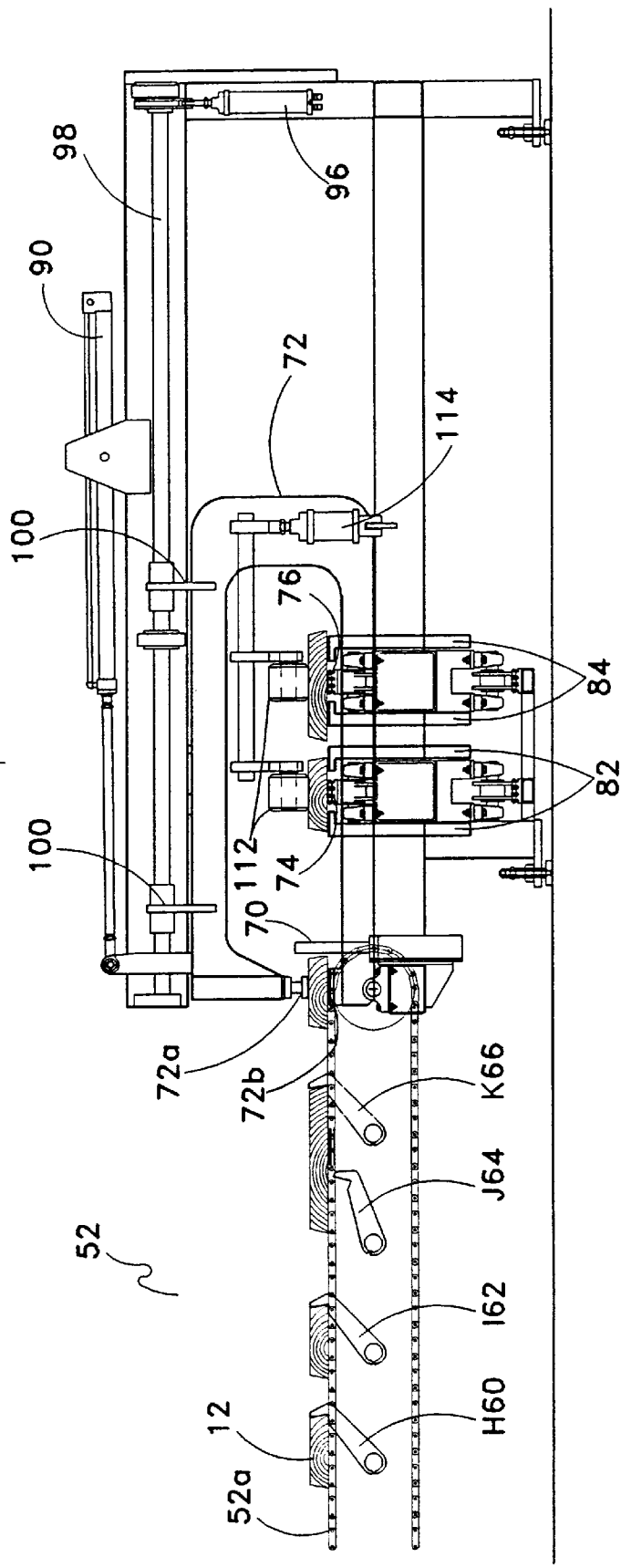
FIG. 3 is an enlarged side elevation view according to a preferred embodiment of the invention.
Figure 4:
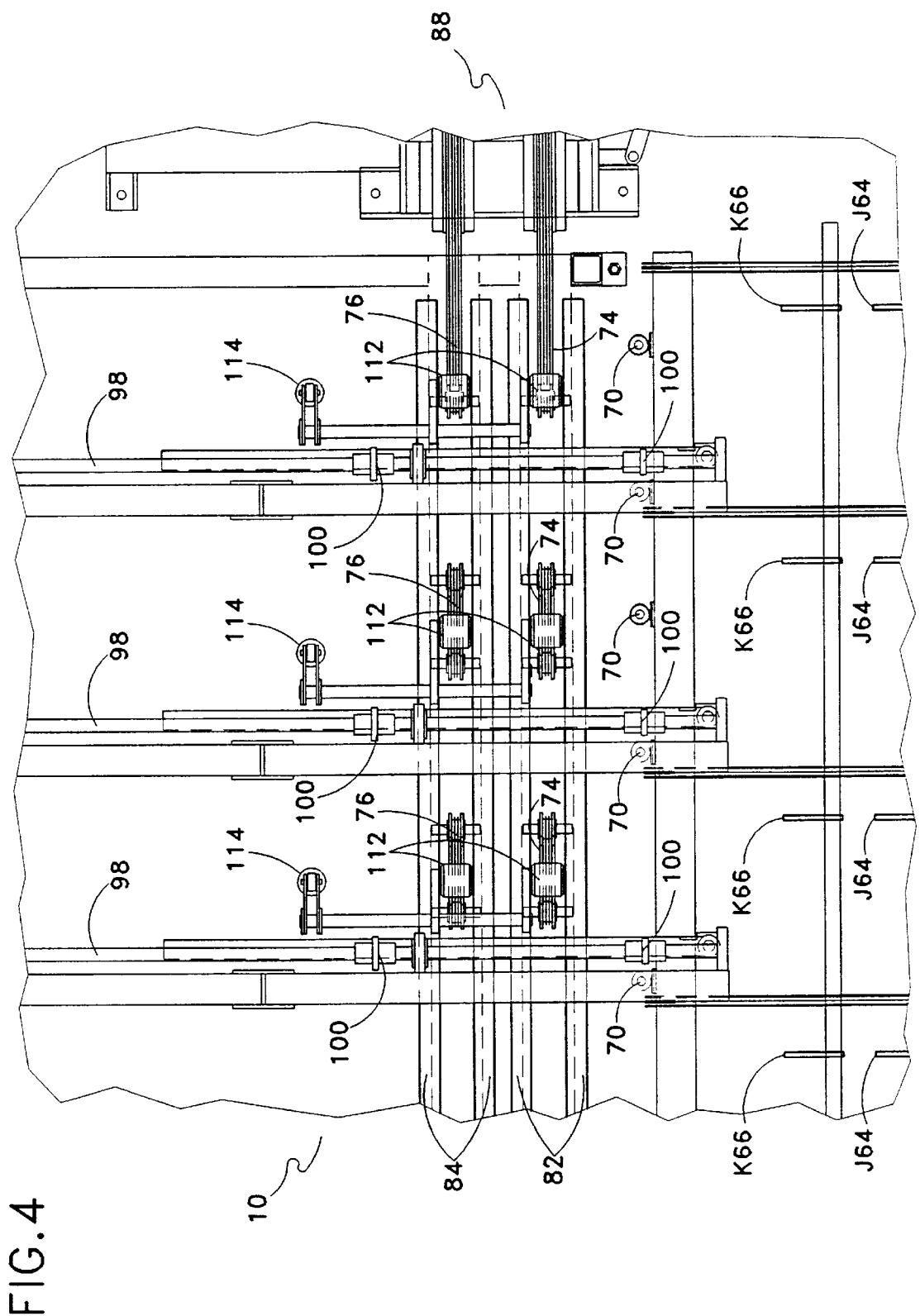
FIG. 4 is an enlarged plan view according to a preferred embodiment of the invention.
Figure 6:
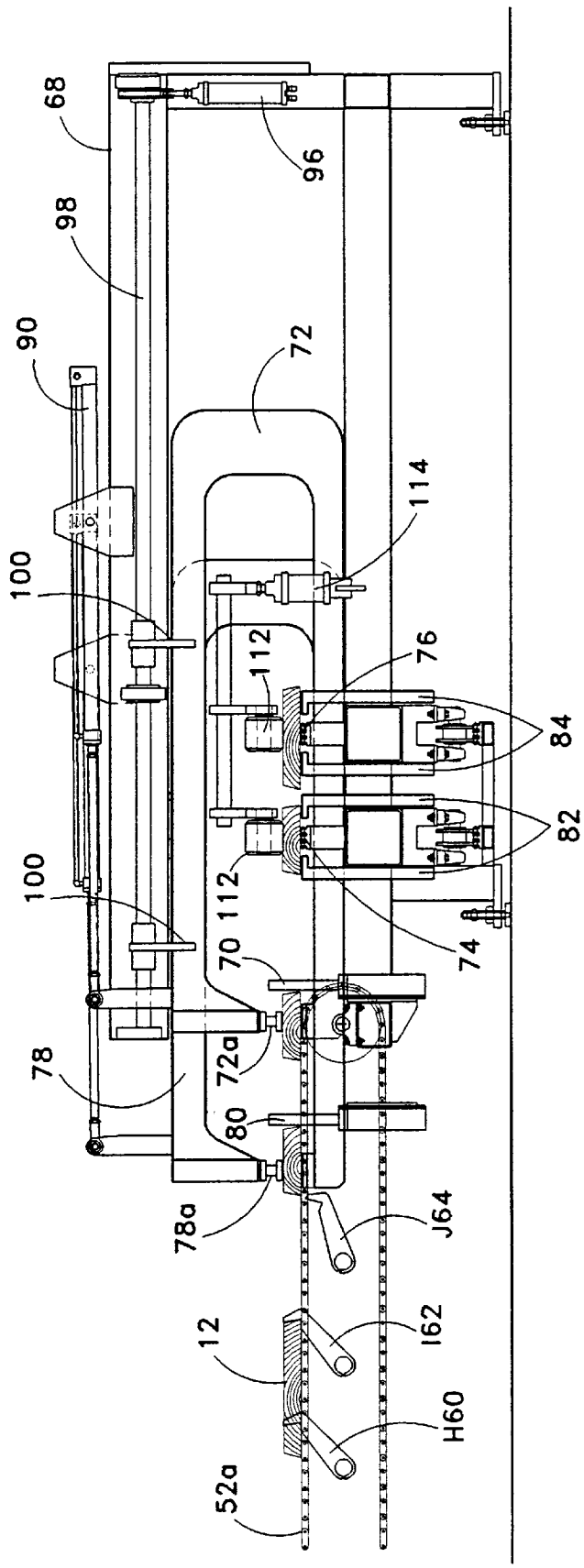
FIG. 6 is an enlarged side elevation view according to an alternative embodiment of the invention.
Figure 7:
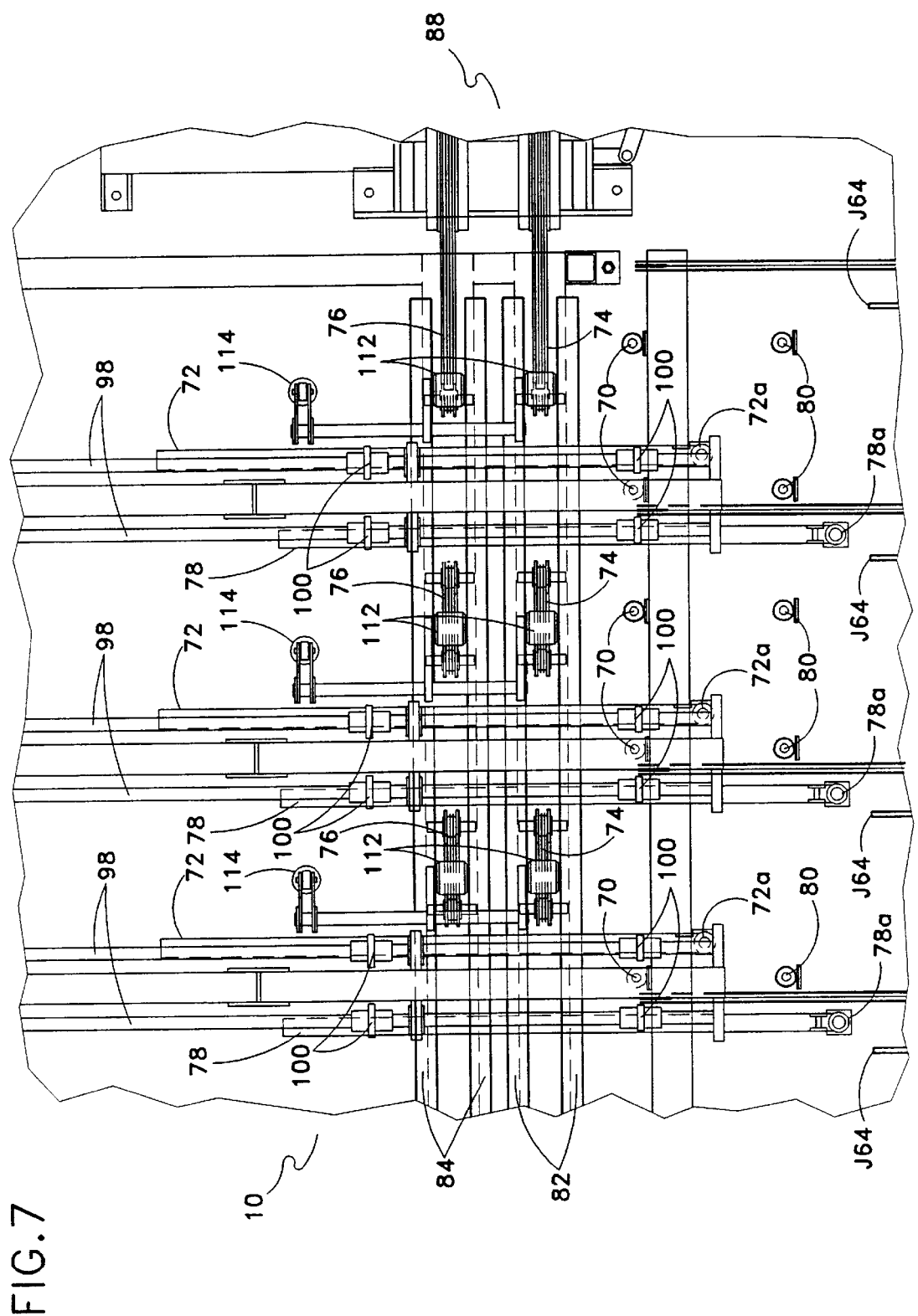
FIG. 7 is an enlarged plan view according to an alternative embodiment of the invention.

The positioning table 10, with a support frame 68, has a row of park zone pin stops 70 preceding the positioning table 10. With second positioners 78 installed in an alternative embodiment, another row of park zone pin stops 80 are needed as illustrated in FIG. 5. Pin stops 70 are normally up. The positioning table 10 includes a plurality of positioners 72, more clearly seen in FIG. 3, for grasping and moving flitch 12 over either the outer feedchains 74 or inner feedchains 76. A further alternative embodiment includes a second group of positioners 78 (FIG. 5 and 6) that can grasp one or two flitches at a time (two flitches when operating in tandem) depending on: (1) their width, (2) their order, whether depending random or sorted in the in-feed position over the outer feedchains 74 or inner feedchains 76, (3) their length and/or their width coming onto the sequencing transfer 52, and (4) potentially the programming that is being utilized, that is, the spacing of the saws and whether or not the saw spacing is being changed. Tandem operation requires that a second row of park zone pin stops 80, be mounted in front of park zone pin stops 70. When park zone pins 80 become available on positioning table 10, flitch 12 is then sequenced from ducker 64 or 66 to the park zone pins 70 or 80.

Positioners 72 or 78 grasp flitch 12 at both ends 12a and 12b (better described below) at the park zone pins 70 or 80 (depending on the particular embodiment and the width of the flitch being grasped) and position the flitch(s) on to a pair of vertical moving drop skid assemblies 82 and/or 84 (depending on the width of the flitch), over infeed sharp chains 74 and/or 76. Positioners 72 and/or 78 skew the cant(s) or flitch(s) 12 for alignment with saw blades 86 for feeding into the edger 88.

Positioners 72 and 78 include horizontal actuable cylinders 90 that extend and retract to move a positioner out to grasp a flitch 12 (or flitches) at park zone pins 70 and 80, and retract in moving flitch 12 (or flitches) over feedchains 74 and 76. The positioners 72 and 78 include grasping jaws 72a and 72b, and 78a and 78b respectively that grasp flitch 12 (or flitches) for positioning over feedchains 74 and/or 76 where upper jaws 72a and 78a may be selectively actuable vertically to engage an upper surface of a flitch 12 and where lower jaws 72b and 78b, vertically aligned with corresponding upper jaws 72a and 78a, may be fixed or selectively vertically actuable to engage a lower surface of a flitch 12.

Positioners 72 and 78 also include vertical cylinders 96 that extend to move positioners 72 and 78 up, thus moving flitch 12 (or flitches) up when grasped to clear the raised drop skid assemblies when moving the flitch 12 (or flitches) over the feedchains 74 and 76. The vertical cylinders 96 cause eccentrically mounted horizontal shaft 98 to rotate in one direction causing positioner mounting brackets 100 to raise positioners 72 or 78 when vertical cylinders 96 extend, or, when rotated in the opposite direction, to lower positioners 72 or 78 when vertical cylinders 96 retract.

Figure 8:
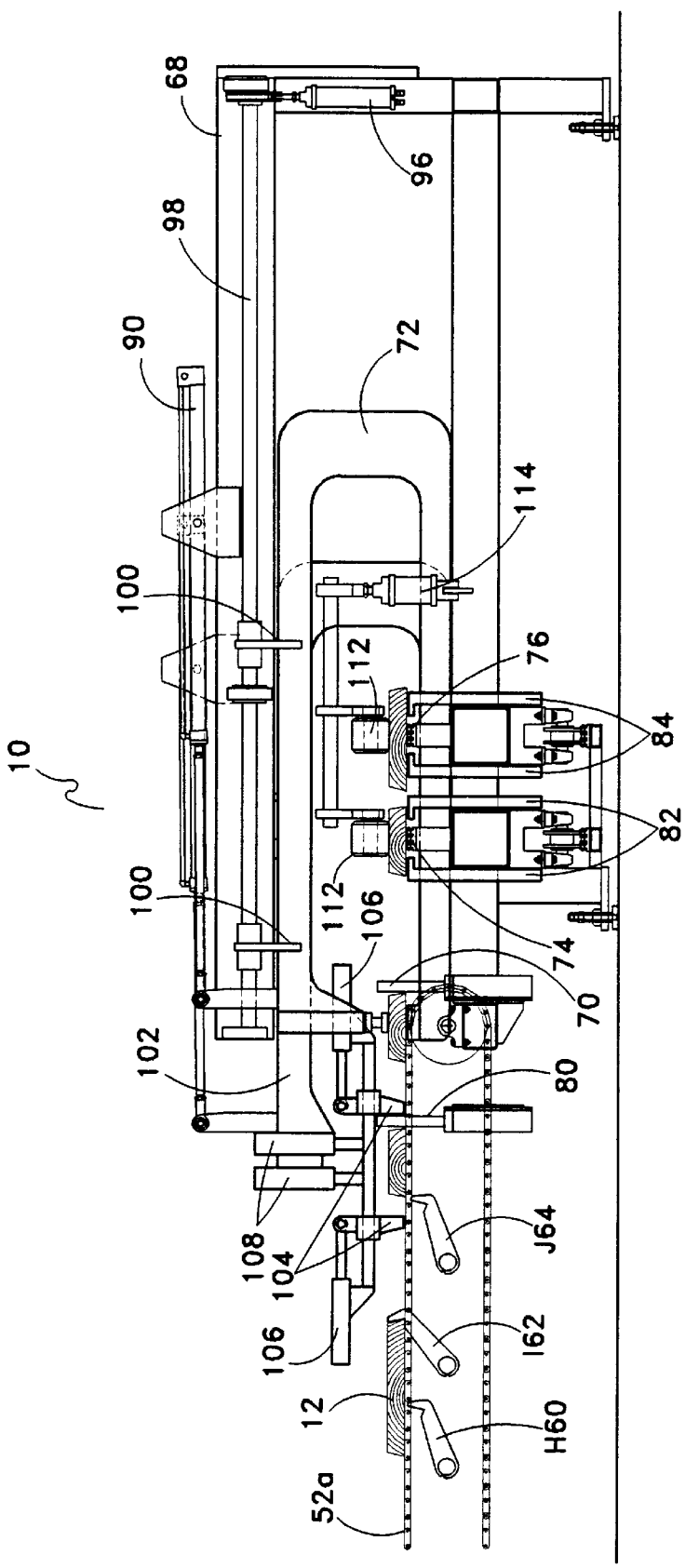
FIG. 8 is an enlarged side elevation view according to a further alternative embodiment of the invention.
Figure 9:
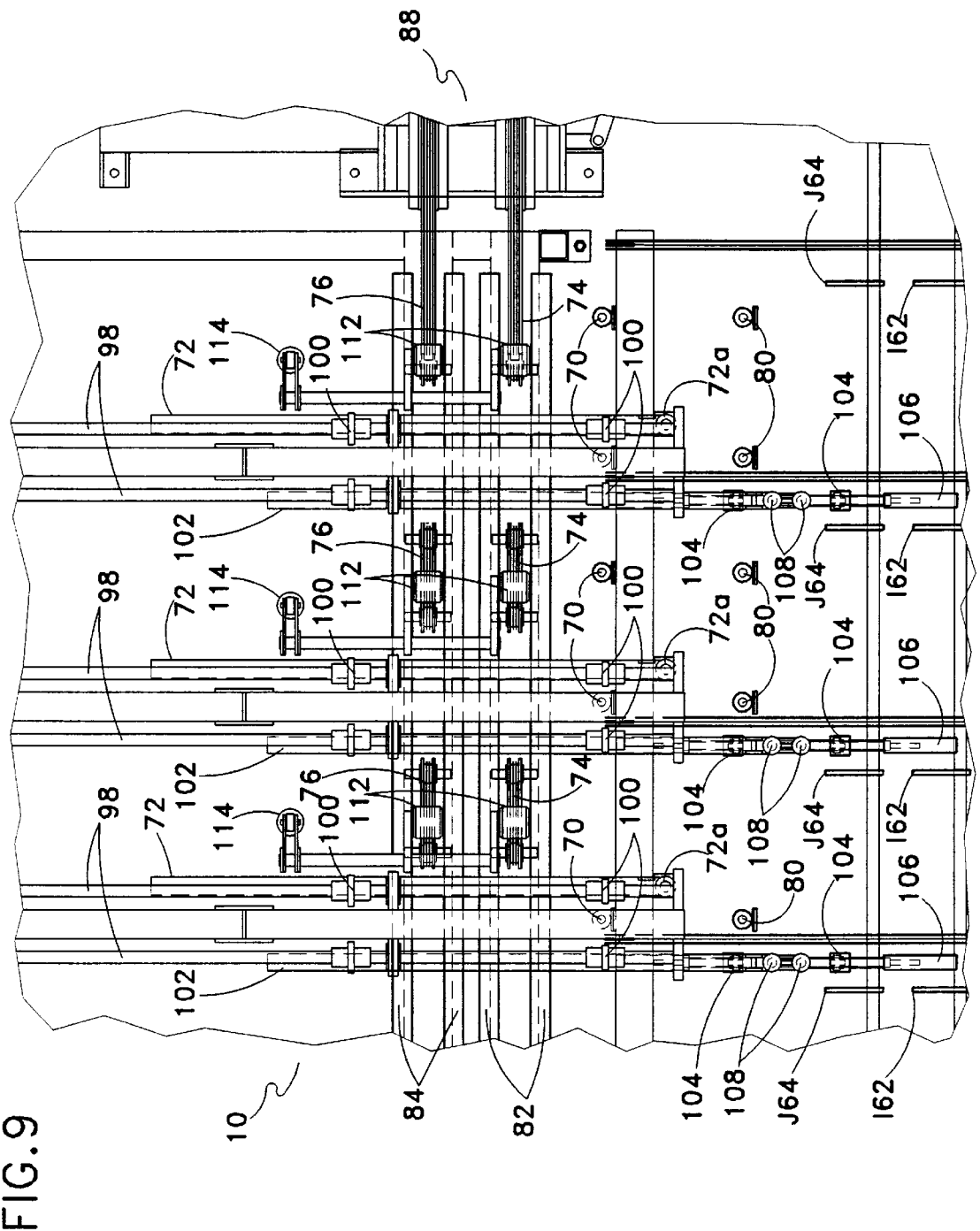
FIG. 9 is an enlarged plan view according to a further alternative embodiment of the invention.

In an alternative embodiment (FIGS. 8 and 9), positioner 102 includes horizontal positioner cylinders 90 that extend to move the positioner 102 out to grasp flitch 12 (or flitches) at park zone pins 70 and 80, and that retract to move flitch 12 (or flitches) over the feedchains 74 and 76. Positioner 102 includes grasping jaws 104 that grasps flitches laterally for positioning over feedchains 74 and 76. Grasping jaws 104 are actuated by horizontal cylinders 106. Vertical cylinders 108 are selectively actuable to raise grasping jaws 104, thus moving the flitch 12 up when grasped to clear any flitches that are at either the inner park zone pins 70 or the outer feedchains 74 position, thus allowing positioning of flitches for feeding into the edger 88, when positioner 102 is translated by selective actuation of cylinder 90.

Pressrolls 112, actuated by press roll cylinders 114, press flitch 12 onto drop skid assemblies 82 and 84. Pressrolls 112 press flitch 12 onto sharp chains 74 and 76 once drop skid assemblies 82 and 84 are lowered and positioners 72 or 78 release their grasp on flitch 12. Saw blades 86 are selectively adjusted to their optimized position, as pre-determined by the optimizer 116, prior to flitch 12 entering edger 88. Flitch 12 is advanced into saw blades 86 where saw blades 86 cut flitch 12, that is, edge and/or section flitch 12, into predetermined board sizes. The finished boards and edgings (not shown) leave edger 88 on tailer belt 118 and enter a tailer 120. Tailer fingers 122 adjust to their appropriate positions to separate the boards from the trimmed edgings thus completing the edging process.

Figure 10:
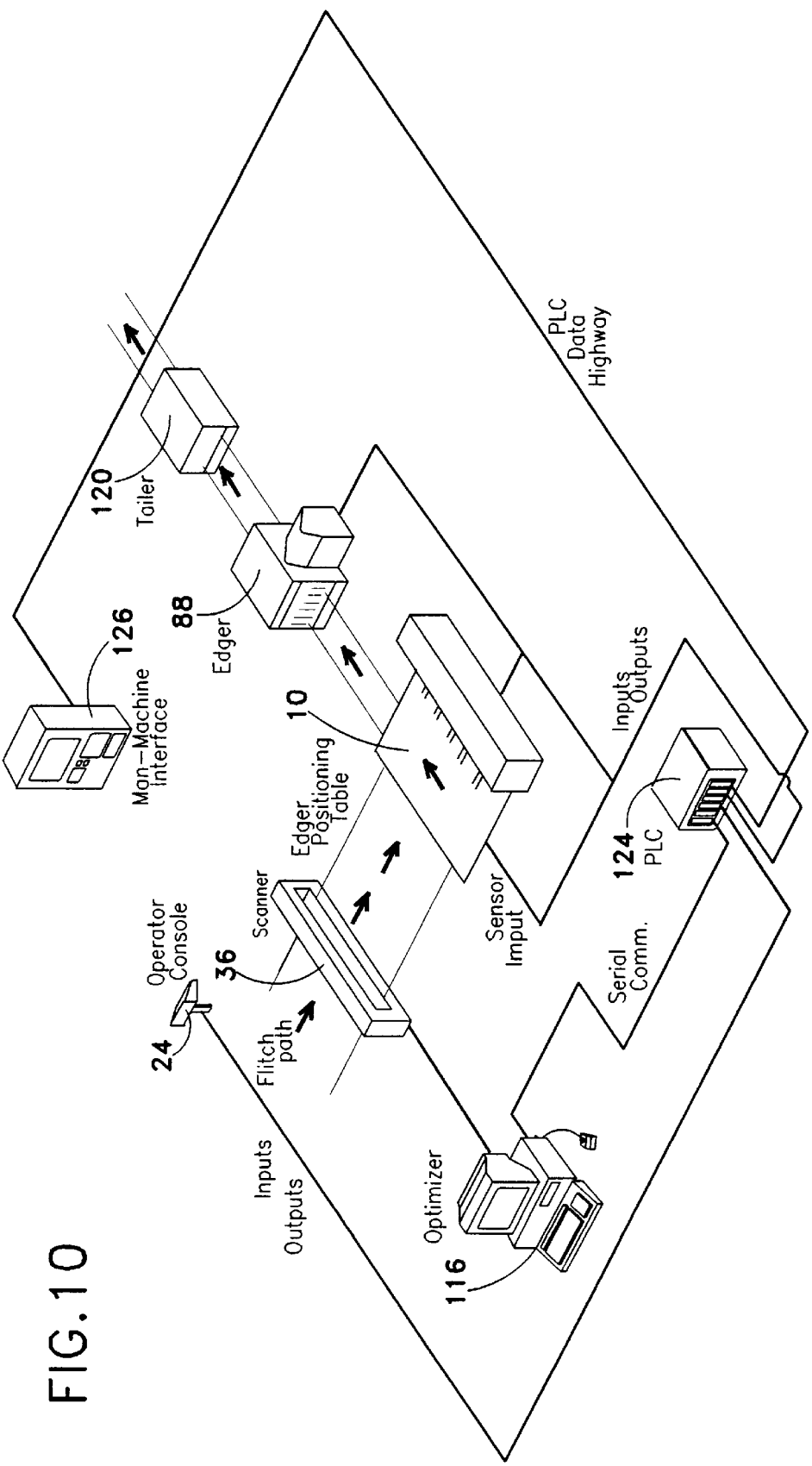
FIG. 10 is a diagrammatic view of an edger system incorporating the present invention.

As best seen in FIG. 10, flitch 12 passes through scanner 36 on the scanner transfer 24 where it is scanned. The measured data, and inputs from the operator at console 24, for example, species selection, different product size requirements, clear sections, visual defects, and sections where no edging is required, are sent to optimizer 116. Optimizer 116 makes a board optimizing decision. This decision is sent to a PLC 124. The PLC 124 keeps track of each flitch 12 as the flitches proceed through the system, raising and lowering duckers so as to sequence the flitches to edger 88, and determining to sort/not sort at the drop-out 54, with the exception of the pre-scanner sort deck option, and the drop-out and turn gate 22 where an operator manually selects through the operator console 24. PLC 124 is used to control other interfaced portions of the system such as positioning table 10, using data obtained from the optimizer 116. PLC 124 determines which of positioners 72 or 78 are actuated and where to place each flitch on positioning table 10, whether it be skewed or on inside feedchains 74 or outside feedchains 76. PLC 124 also determines the positions of saw blades 86 at any given time. Man-machine interface 126 may also be provided to give a visual representation of the flitches progressing through the system and to allow an operator to over-ride the system in the event of a problem by, for example, reversing the direction of the transfer chains or the like. Tailer fingers 122 are positioned once a flitch has travelled a fixed distance into edger 88. If the edger 88 is in an automatic mode, tailer fingers 122 are set according to an optimizer 116 decision. In a manual mode, PLC 124 sets the position of tailer fingers 122.

Sort deck 42 in an alternative embodiment would hold either long, short or wide flitches depending on the predominant sizes being edged and the programming that optimizer 116 is utilizing. The purpose of the sort deck 42 is to provide an improved degree of selection to enable a more constant feed to edger 88, so as to eliminate gaps in the infeed to edger 88 due to different flitch lengths and widths.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for feeding of flitches to a board edger comprising:
   a sequencing transfer for transferring a first flitch into abutting relation against a first stop means so as to orient said first flitch longitudinally in a first direction;
   a first positioner for grasping said first flitch and transferring said first flitch in a second direction perpendicular to said first direction from said abutting relation against said first stop means onto means for feeding said board edger, wherein said means for feeding said board edger comprises first and second edger feeders, said first and second edger feeders adjacent and generally parallel to each other;
   a programmable logic controller for optimized selective controlling of said sequencing transfer, said first positioner and said first and second edger feeders,
   (a) so as to transfer said first flitch onto said first edger feeder or onto said second edger feeder, according to a determination by said programmable logic controller if said first flitch is narrow enough to be carried by said first edger feeder or said second edger feeder, and
   (b) so as to transfer said first flitch onto both said first edger feeder and said second edger feeder if said first flitch is wide enough to be carried on both said first edger feeder and said second edger feeder.

2. The apparatus of claim 1 further comprising a second stop means, adjacent to said first stop means, on said sequencing transfer, and a second positioner for grasping and transferring onto said means for feeding said board edger, in a direction parallel to said second direction, a second flitch which has been transferred by said sequencing transfer into abutting relation against said second stop means, according to said determination by said programmable logic controller.

3. The apparatus of claim 2 wherein said transferring of said first flitch and said second flitch by said first and second positioners respectively is sequential or simultaneous according to said determination by said programmable logic controller.

4. The apparatus of claim 1 further comprising
   a scanner and an optimizer cooperating with said programmable logic controller,
   wherein said sequencing transfer includes a transfer chain and selectively actuable sequencing arrays of selectively positionable members spaced apart in said first direction, said sequencing arrays selectively actuable according to said programmable logic controller,
   and wherein said first positioner is selectively actuable and adapted, to sequentially: (a) selectively grasp and raise said first flitch from said sequencing transfer, (b) selectively translate said first flitch in said second direction, (c) selectively skew said first flitch in a horizontal plane as determined by said programmable logic controller cooperating with said optimizer, and (d) selectively lower and release said first flitch onto said means for feeding said board edger.

5. The apparatus of claim 4 wherein said first positioner comprises selectively actuable opposed clamping jaws for selective clamping of said first flitch between said clamping jaws, and wherein said opposed clamping jaws arc rigidly supported on at least one flitch positioner frame, said at least one flitch positioner frame selectively elevatable by first selective actuating means and selectively translatable in said second direction by second selective actuating means.

6. The apparatus of claim 5 wherein said at least one flitch positioner frame is elongate in said second direction and said first positioner includes a pair of adjacent parallel said flitch positioner frames longitudinally parallel in said second direction, said flitch positioner frames each defining therein an elongate cavity extending in said second direction from an upstream end, said opposed clamping jaws mounted in opposed relation at said upstream end, said elongate cavity sized to receive therein said first and second edger feeders.

7. The apparatus or claim 6 wherein said at least one flitch positioner frame and corresponding said elongate cavity each lies in a generally vertical plane in said second direction and said elongate cavity defines a vertical first opening at said upstream end, and wherein said opposed clamping jaws straddle said first opening.

8. The apparatus of claim 7 wherein on at least one of said at least one flitch positioning frames said opposed clamping jaws are vertically opposed across said first opening.

9. The apparatus of claim 7 wherein on at least one of said at least one flitch positioning frames said opposed clamping jaws are horizontally opposed in said first direction across said first opening.

10. The apparatus of claim 4 wherein said sequencing transfer further comprises selectively actuable flitch drop-out means.

11. The apparatus of claim 4 wherein said sequencing transfer further comprises selectively elevatable flitch culling means for culling and elevating selected flitches, including a selectively elevatable sort deck having a sort deck ramp at upstream and downstream ends thereof, cooperating with a transfer chain translating flitches in said second direction, for transfer of flitches in said second direction from said transfer chain onto, across and down from said sort deck when said sort deck is in an elevated sorting position so as to thereby provide for sorting and culling flitches on said sort deck and for return of sorted flitches onto said transfer chain.

12. The apparatus of claim 7 wherein said first and second edger feeders include selectively elevatable press rolls for selectively applying a downward force to frictionally engage flitches on said first and second edger feeders in registration with corresponding selectively elevatable drop skid assemblies, selectively elevatable so as to selectively feed flitches from said drop skid assemblies onto transfer means conveying flitches on said first and second edger feeders in a direction parallel to said first direction.

13. The apparatus of claim 12 wherein said edger comprises selectively positionable saws selectively positionable across said transfer means, and wherein said selectively positionable saws are selectively positioned according to a determination by said programmable logic controller.

14. The apparatus of claim 12 wherein said flitch positioner frames arc "U"-shaped members.

* * * * *